UNITED STATES PATENT OFFICE.

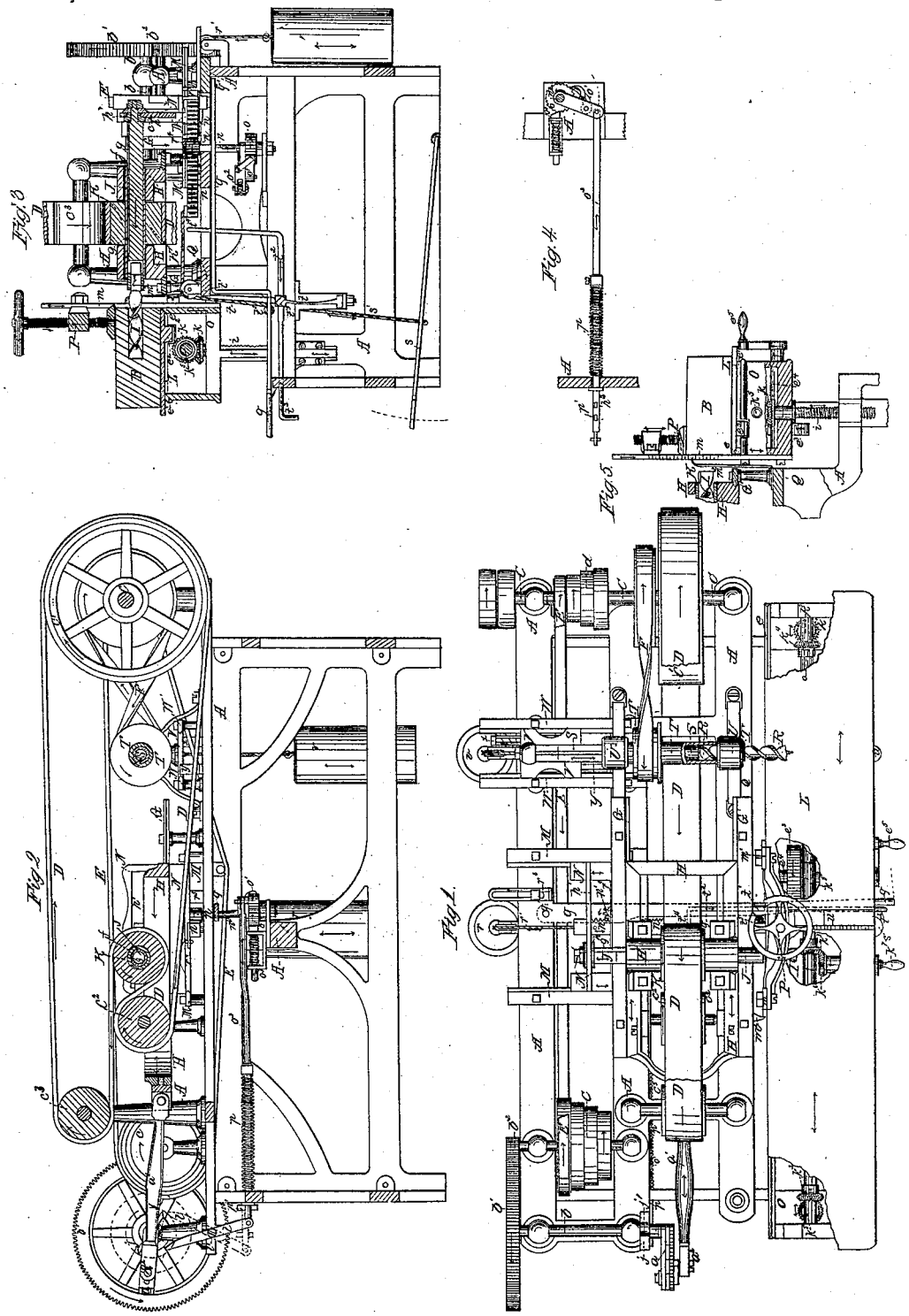

HIRAM E. PAINE, OF TROY, NEW YORK.

DEVICE FOR FEEDING CUTTERS INTERMITTENTLY IN MORTISE-BORING MACHINES.

Specification of Letters Patent No. 17,799, dated July 14, 1857.

*To all whom it may concern:*

Be it known that I, HIRAM E. PAINE, of the city of Troy, in the county of Rensselaer and State of New York, have invented certain new and useful Improvements in Machines for Boring Round Holes and Cutting Oblong Mortises with Semicircular Ends in Heavy Timber, the mortising being done by means of a rotary bit or cutter, which is revolved, reciprocated sidewise, and fed endwise into the stationary timber; and I do hereby declare that the following is a full, clear, and exact description of my invention, reference being had to the annexed drawings, making a part of this specification.

The object of my invention is only the improvement of such a machine, substantially in the manner hereinafter described. First, so that the revolving, sidewise-reciprocating and endwise-moving mortising bit thereof shall be successively fed in an instantaneous manner by the machine endwise into the stationary timber at, and only at, the ends of the mortise, whatever length of mortise is being cut, in order that the depth of the stock to be cut away by the bit shall be the same from end to end of the mortise, instead of gearing the bit so that it shall be constantly fed endwise, and hence take a chip, gradually increasing in thickness, from one end of the mortise to the other, and instead of so gearing the bit that it shall be fed endwise by the machine step by step into the timber at other places than the ends of the mortise upon altering the stroke of the mortising bit to cut mortises of different lengths, thus making the bit, as it is reciprocated, sometimes take an exceedingly heavy chip and at others none at all. Also, so that when the spindle of the mortising or of the boring bit is supported and revolved by, and slid endwise within a tubular shaft which does not slide endwise, the shaking or trembling of the spindle within the tubular shaft shall not increase with the depth of the hole or mortise cut by the bit, and that the trembling of the bit shall be much less, so as to make the bit cut more evenly, and make the mortises of more uniform size from top to bottom, and bore holes more truly in the required direction than when my improved mode of constructing and arranging together the parts which hold, revolve, and slide endwise the mortising or boring bit, as hereinafter described, is not adopted.

In the annexed drawings, making a part of this specification, Figure 1 is a plan, Fig. 2 a longitudinal sectional elevation, and Fig. 3 a transverse sectional elevation of a machine, in which the purposes of my invention, as above specified, are completely attained; and the principles thereof embodied in the manner which I prefer; and Fig. 4 is a plan, and Fig. 5 a sectional elevation of the same machine.

The same letters refer to like parts in all the figures, and the arrows indicate the directions in which the parts move.

The precise construction of this machine is as follows, viz:

A is the framework which supports all the mortising and boring machinery, and the vertically and longitudinally adjustable stationary table or bed which supports the timber B while being mortised and bored.

C is the shaft which gives motion to the mortising machinery by means of the belts D and E, and to the boring mechanism by the belt F.

G, G' are fixed ways upon which the carriage H, which carries the mortising-bit I, is slid back and forth by the crank, $a$, and pitman, $a'$; which crank is fast on the shaft $b$, and is slotted so that the crank-pin, $a^2$, can be adjusted to reciprocate the bit the various distances required to cut mortises of different lengths. The shaft $b$ receives rotary motion from the shaft C, by means of the gear wheel $b'$, pinion $b^2$, and the belt E, which passes around a pulley of each of the cones $c$ and $d$. By running the belt E upon different pulleys of these cones, the quickness of the reciprocating movements of the mortising bit I can be varied, while its rotary motion remains unchanged.

The mortising bit is fastened into the front end of the spindle J, which is fitted to slide endwise within the tubular pulley-shaft K, whose journals turn within fixed boxes in the sliding carriage H. The spindle J turns with the sleeve-shaft K, for the feather $f$ in the sleeve fits the groove $g$ in the spindle; so that while the carriage H is being slid back and forth, the bit I is revolved by the belt D running around the pulley $c'$, fast on the shaft C, the adjustable tightening pulley $c^2$, whose journals turn in the sliding frame H, the pulley shaft K, and the pulley $c^3$ mounted on the frame-work A.

M M' are fixed ways upon which the frame N slides; and the back end of the spindle J has a journal fitted to turn within the box $h$, which fits and slides on the guides $h'$ $h^2$ of the frame N, so that by sliding this frame N back and forth the spindle J is thereby likewise slid endwise while being revolved and reciprocated sidewise; and the ways M M' are so arranged and the groove $g$ and feather $f$ are so formed and arranged together, and the bit I is fastened into the spindle in such a manner that the bit can be drawn back within the sleeve, (so that the shaking or trembling of the spindle J within the tubular shaft K does not increase with the depth of the mortise cut by the bit, and is much less, and consequently the bit cuts more truly and makes the mortises of more uniform size from top to bottom than if the bit was not taken within the sleeve-pulley K,) as indicated by Fig. 5.

A rack $n$ is fastened to the frame N. A pinion $n'$ gears into the rack $n$ and is fast on the shaft $n^2$ of the ratchet wheel $o$, which is moved forward step by step by the spring-pawl $o'$, operated by the reciprocating rod $o^2$, and is retained by the spring-dog $o^3$. The rod $o^2$ is jointed to the lever $l$, which is hung to the frame-work at $l'$. Two arms $j$ $j'$ are fastened upon the shaft $b$, and are so formed and arranged in relation to the lever $l$ and the crank-pin $a^2$ as to press the lever $l$ into the position shown by the dotted lines in Fig. 2, and thereby draw the reciprocating rod $o^2$ back so as to compress the spring $p$, so that whenever the mortising bit just reaches the ends of the mortise the arms $j$ $j'$ let go of the lever $l$ and the spring $p$ instantly feeds the bit endwise into the timber. By inserting the stop-pin $p'$ in different holes $p^2$ in the rod $o^2$ the depth of this feed is varied. The crank $a$ is so slotted that when the crank-pin $a^2$ is fastened at different distances from the axis of the shaft $c$ to cut mortises of different lengths, the arms $j$ $j'$ still let go of the lever $l$ at the ends of the mortise, so that the bit is successively and instantly fed endwise into the timber at, and only at, the ends of the mortise, whatever length of mortise is being cut, without readjusting the parts which feed the mortising bit endwise to those which reciprocate the same bit sidewise upon altering the stroke of the mortising bit.

The shaft $n^2$ has its upper journal in the lever $q$, which is hung to the frame-work at $q'$, and is supported so that the pinion $n'$ is thrown into and out of gear with the rack $n$ by means of this lever. A weight $r$ is fastened to the frame-work N by a cord $r'$, to draw the bit back within the sleeve K when the pinion $n'$ is thrown out of gear. The backward movement of the mortising bit is limited by the part $r^4$ of the frame N striking against the adjustable stop $r^3$. The pinion $n'$ is kept in gear with the rack $n$ by means of the spring-bar $t$, which passes through the lever $q$, and catches back of the fixed stop $t'$; and $t^2$ is a rod, which slides through the spring $t$, and can be fastened therein at any desired point, by the set-screw $t^3$. The end $t^4$, of the rod $t^2$, is in such position that the frame N will strike it as the bit is fed endwise in cutting a mortise, and push the spring-bar $t$ out from behind the stop $t'$, so as to let the spring $t^5$ move the lever $q$ so as to throw the pinion out of gear with the rack $n$. By adjusting the rod $t^2$ in the spring-bar $t$, the machine is made to stop the mortising and withdraw the bit from the mortise, at any desired depth.

A treadle $s$ is connected to the frame N by a cord $s'$ so that the bit can be drawn forward and fed into the timber by the foot of the attendant in boring round holes; which boring can be done, when the belt E is thrown off, with the bit I in any desired position within the limits allowed by the stroke of the crank $a$.

The timber-bed or table consists of the top-plate L and the supporting frame O. The plate can be slid upon the ways $e$, $e'$ by means of the rack $e^2$ fast on the plate L and the pinion $e^3$ fast on the shaft $e^4$ of the hand-crank $e^5$; and the frame O, with the plate L, can be slid up and down within suitable guides on the frame-work A; by means of the screws $i$ which are simultaneously turned by means of the bevel pinions $k$, $k'$ on the screws; those $k^2$, $k^3$, $k^4$ on the shaft $k^5$, and the one $k^6$ on the shaft of the hand-crank $k^7$. The clamp P for holding the timber firmly on the bed is mounted on the standards $m$, $m'$ fastened to the frame O. The timber-bed is arranged as near to the front Q of the frame-work A as can be done and allow the chips in mortising and boring to fall between that part and the bed.

The crank $a$ is graduated upon both sides so that whichever side of the crank is uppermost the crank-pin $a^2$ can be set by the graduations so as to give any desired length of mortise. The standard $m$ is graduated, and an index $m^2$ is arranged on the frame-work A so that the table can be adjusted thereby so that the mortise shall be cut at any desired height above that face of the timber which rests upon the bed-plate L; and this bed-plate is graduated at $u$ for the convenience in setting the rod $t^2$ by the protruding bit so that the mortise shall be cut to any desired depth.

The boring mechanism is constructed and arranged in connection with the mortising mechanism and the vertically and longitudinally adjustable stationary timber-bed as follows, viz: The boring bit R is fastened into the front end of the spindle S which slides endwise within, and is revolved by, the tubular pully-shaft T (which shaft is turned by the belt F in fixed boxes U) all in the same manner that the spindle J of the mortising mechanism is operated; the bit R being taken back within the shaft T the same as the bit I is drawn within the shaft K. The back end of the spindle S turns within a box in the frame V which slides accurately on the fixed ways W, W'; so that by sliding this frame the bit R is fed into the timber and drawn back within the sleeve. A weight $v$ is fastened to the sliding frame V to draw the bit back, and also a treadle $w$, to feed the bit forward in boring, in the same way that the weight $r$ and treadle $s$ are attached to the frame N in the mortising mechanism. An adjustable stop $x$ is arranged to limit the backward movement of the bit, and another $y$ to limit the depth of the boring as desired. The spindle S is arranged parallel to, and at about the same distance above and from, the bed plate L as the shaft J and at any desired place between the mortising mechanism and the driving shaft C; so as to occupy but little room and make the timber bed of the mortising apparatus serve for that of the boring mechanism.

What I claim as my invention and desire to secure by Letters Patent is—

1. Constructing the machine as herein described so that the revolving, sidewise-reciprocating mortising bit thereof is moved by the machine alone endwise into the timber at and only at the ends of the mortise, whatever length of mortise is being cut, as set forth.

2. And I also claim the herein described means used to prevent increased trembling of the mortising or boring bit as the depth of the cutting increases.

HIRAM E. PAINE.

Witnesses:
E. H. UNIVE,
THOS. ROBINSON.